(12) United States Patent
Copeland

(10) Patent No.: US 10,815,843 B2
(45) Date of Patent: Oct. 27, 2020

(54) HYDRAULICALLY-ACTUATED SWITCHABLE ONE-WAY CLUTCH

(71) Applicant: SCHAEFFLER TECHNOLOGIES AG & CO. KG, Herzogenaurach (DE)

(72) Inventor: James Copeland, Massillon, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 175 days.

(21) Appl. No.: 15/975,250

(22) Filed: May 9, 2018

(65) Prior Publication Data
US 2019/0345850 A1    Nov. 14, 2019

(51) Int. Cl.
| | | |
|---|---|---|
| F01L 1/34 | (2006.01) | |
| F01L 1/08 | (2006.01) | |
| F16D 47/04 | (2006.01) | |
| F16D 41/08 | (2006.01) | |
| F01L 1/344 | (2006.01) | |
| F16D 41/07 | (2006.01) | |
| F16D 25/061 | (2006.01) | |

(52) U.S. Cl.
CPC ............... F01L 1/3442 (2013.01); F01L 1/08 (2013.01); F16D 41/088 (2013.01); F16D 47/04 (2013.01); F16D 25/061 (2013.01); F16D 41/076 (2013.01)

(58) Field of Classification Search
None
See application file for complete search history.

(56) References Cited

U.S. PATENT DOCUMENTS

| | | | | |
|---|---|---|---|---|
| 1,957,500 A | * | 5/1934 | Harris | ..................... F16D 47/04 |
| | | | | 192/48.3 |
| 4,185,723 A | * | 1/1980 | Kelbel | .................. F16D 41/105 |
| | | | | 180/247 |
| 4,354,585 A | | 10/1982 | Ritter | |
| 6,409,001 B1 | * | 6/2002 | Kerr | ...................... F16D 41/064 |
| | | | | 192/43 |

(Continued)

FOREIGN PATENT DOCUMENTS

| | | |
|---|---|---|
| CN | 105465226 A | 4/2016 |
| JP | 2002349609 A | 12/2002 |

OTHER PUBLICATIONS

International Search Report and Written Opinion for International Application No. PCT/US2019/017976 dated May 31, 2019.

*Primary Examiner* — Colby M Hansen
(74) *Attorney, Agent, or Firm* — Brooks Kushman P.C.

(57) ABSTRACT

A switchable one-way clutch (SOWC) is configured to operate in both a freewheeling mode and a one-way clutch mode. The SOWC includes an inner race with a plurality of external cams, and a cylindrical outer race. A plurality of rollers are disposed radially between the inner cams and the outer race. A cage is connected to an outer phaser and includes a plurality of tabs. An inner phaser has a plurality of lobes extending radially outwardly, and the outer phaser has a plurality of inwardly-extending portions. The lobes and the inwardly-extending portions cooperate to define chambers. When fluid is applied to the chambers, the outer phaser rotates relative to the inner phaser. This causes the cage to rotate along with the outer phaser. When the cage rotates, its tabs move away from the rollers, enabling the assembly to function as a one-way clutch.

20 Claims, 7 Drawing Sheets

(56) References Cited

U.S. PATENT DOCUMENTS

2003/0131675 A1 7/2003 Lipman
2005/0133329 A1 6/2005 Gradu et al.
2013/0025403 A1 1/2013 Wigsten
2015/0176662 A1 6/2015 Lee et al.

* cited by examiner

HYDRAULICALLY-ACTUATED SWITCHABLE ONE-WAY CLUTCH

TECHNICAL FIELD

The present disclosure relates to a switchable one-way clutch. More specifically, this disclosure relates to a clutch that can operate in a first mode in which the clutch freewheels in both directions, and a second mode in which the clutch acts as a one-way clutch preventing rotation in one direction. The switching between the first and second modes can be done via hydraulic actuation.

BACKGROUND

One-way clutches are known in the automotive industry for transferring torque between an input and an output when the input is rotating in one direction relative to the output, and for allowing the input to freewheel in the opposite direction. One-way clutches have been used in automatic transmissions and associated components to allow an input to drive a driven member while allowing freewheeling to occur between the input and the driven member when necessary.

It would be desirable to be able to selectively control a clutch such that at sometimes the clutch operates as a one-way clutch, and at other times the clutch allows freewheeling in both directions. This would allow the selective application of torque through the clutch.

SUMMARY

According to one embodiment, a switchable one-way clutch (SOWC) is configured to operate in both a freewheeling mode and a one-way clutch mode. The SOWC includes an inner race having a plurality of external cams, and a cylindrical outer race. A plurality of rollers are disposed in the grooves and radially between the inner race cams and the outer race. A cage has protrusions configured to selectively contact the rollers and force the rollers radially inward into grooves between the cams, in order to deactivate them. An inner phaser has a plurality of lobes extending radially outward. An outer phaser has a plurality of inwardly-extending portions defining chambers therebetween, with each chamber sized to receive a corresponding one of the lobes of the inner phaser, wherein the outer phaser is mechanically coupled to the cage. Application of hydraulic fluid to the chambers between the inwardly-extending portions and the lobes causes the outer phaser to rotate relative to the inner phaser to rotate the cage protrusions away from the rollers, enabling the assembly to function as a one-way clutch.

In another embodiment, a SOWC includes an inner race having a plurality of external cams, and an outer race configured to be selectively rotationally fixed to the inner race. A plurality of rollers are disposed radially between the inner race cams and the outer race, wherein movement of the rollers radially outward along the cams engages the outer race with the inner race. An inner phaser has a plurality of openings extending radially therethrough and a plurality of lobes extending radially outward. An outer phaser is rotatable relative to the inner phaser and has a plurality of inwardly-extending portions. The lobes and the inwardly-extending portions cooperate to define chambers. The outer phaser is biased to a first position relative to the inner phaser. Application of hydraulic fluid through the openings and into the chambers causes the outer phaser to rotate relative to the inner phaser to a second position to force the rollers radially inward in the grooves to allow freewheeling between the inner race and the outer race.

In yet another embodiment, a SOWC includes an inner race extending along an axis, and an outer race extending along the axis. A plurality of rollers are disposed about the axis and radially between the inner race and the outer race. A first phaser has a plurality of openings extending radially therethrough and a plurality of lobes. A second phaser is indirectly connected to the rollers, is rotatable relative to the first phaser, and has a plurality of portions extending radially toward the first phaser. The lobes of the first phaser extend radially toward the second phaser and cooperate with the portions of the second phaser to define chambers. Application of hydraulic fluid into the chambers causes the second phaser to rotate relative to the first phaser to cause the rollers to move in a radial direction to alter the SOWC between a freewheeling mode and a locking mode.

DETAILED DESCRIPTION

Figure 1:
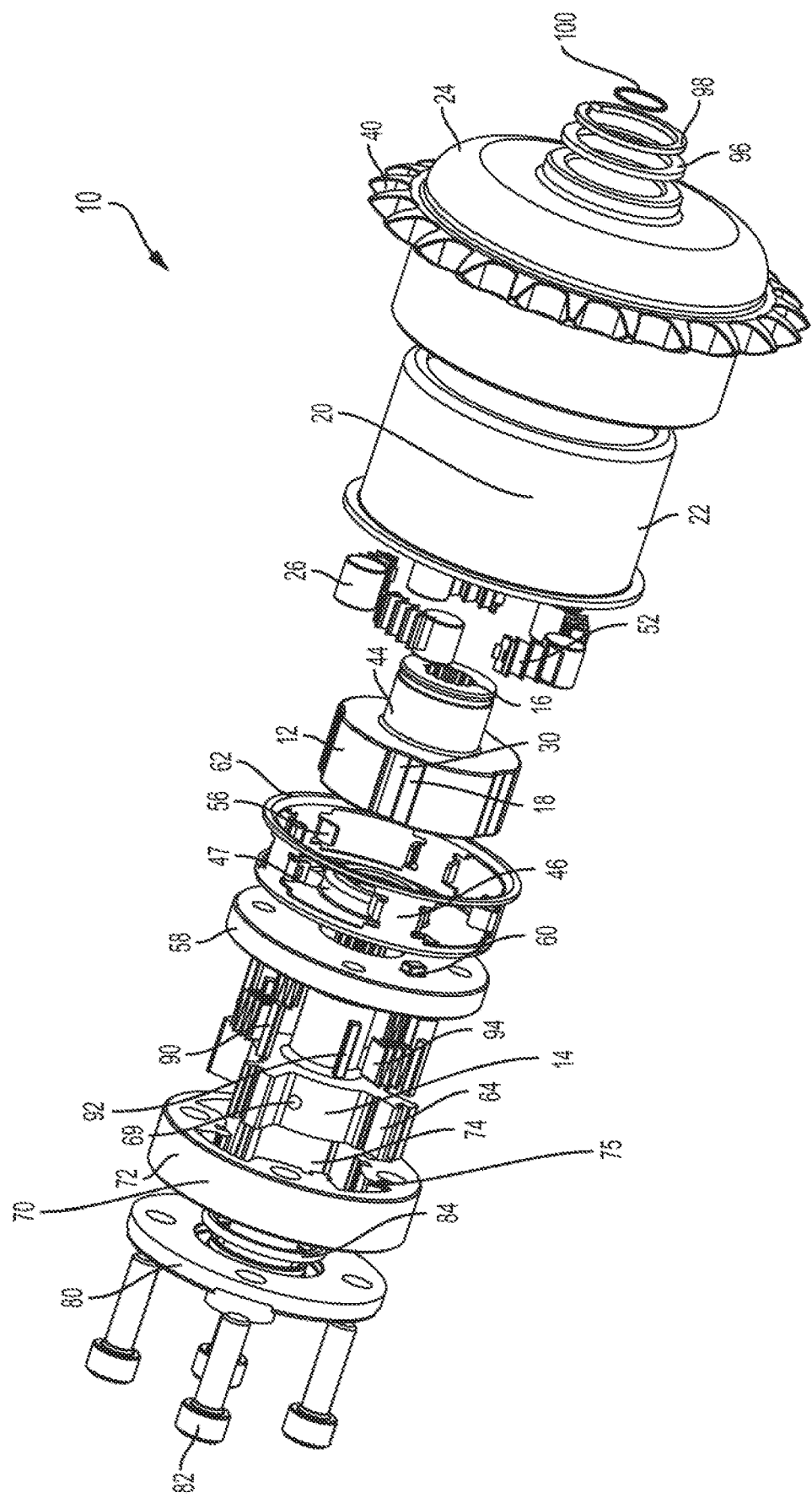
FIG. 1 is an exploded perspective view of a switchable one-way clutch according to one embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology is used in the following description for convenience only and is not limiting. The words "front," "rear," "upper," "lower" designate directions in the drawings to which reference is made. The words "inwardly" and "outwardly" can refer to directions toward and away from the parts referenced in the drawings. The terms "inner" and "outer" can refer to locations toward and away from the central axis of the referenced component. "Axially" refers to a direction along the axis of a shaft or rotating part. "Radial" refers to a direction along a radial axis extending outward from the axis of the shaft or rotating part. The terminology includes the words specifically noted above, derivatives thereof and words of similar import.

In vehicle transmissions, a one-way clutch (OWC) may provide the ability to prevent relative movement between an input shaft and an output shaft in one rotational direction to thereby transfer torque between the input shaft and the output shaft while allowing the input shaft to freewheel in the opposite direction. In other words, a OWC can allow relative rotation between two shafts in one direction while preventing rotation between the two shafts in the other direction. As a result, one-way clutches have been used in torque converters and automatic transmissions to allow an input member to drive a driven member while allowing freewheeling to occur between the input member and the driven member.

A switchable one-way clutch (SOWC) is a one-way clutch that can be dormant or non-active to allow free rotation in both directions, and can also be activated to act as a one-way clutch (OWC) in which rotation is allowed in one direction but prevented in the other direction. In other words, a SOWC provides the ability to selectively activate and deactivate the functions of a one-way clutch. Such switchable one-way clutches are implemented in, for example, a transmission to selectively connect various planetary gearsets. The SOWC such as the one disclosed herein is capable of switching between a "freewheel" mode of operation in which the SOWC allows free rotation in both directions, and a "lockup" mode or "OWC" mode of operation in which the SOWC acts as a one-way clutch and allows rotation in one direction but not in the other direction.

According to various embodiments of this disclosure, a switchable one-way clutch (SOWC) is specifically designed for applications other than those disclosed above. In at least one embodiment, a SOWC is installed in tandem with a hydraulic switching mechanism (e.g., an inner phaser, an outer phaser, and hydraulic fluid provided thereto) onto a common central shaft (e.g., an oil pump drive shaft). The structure accompanying the SOWC is described below in an embodiment illustrated in the Figures.

Figure 2:
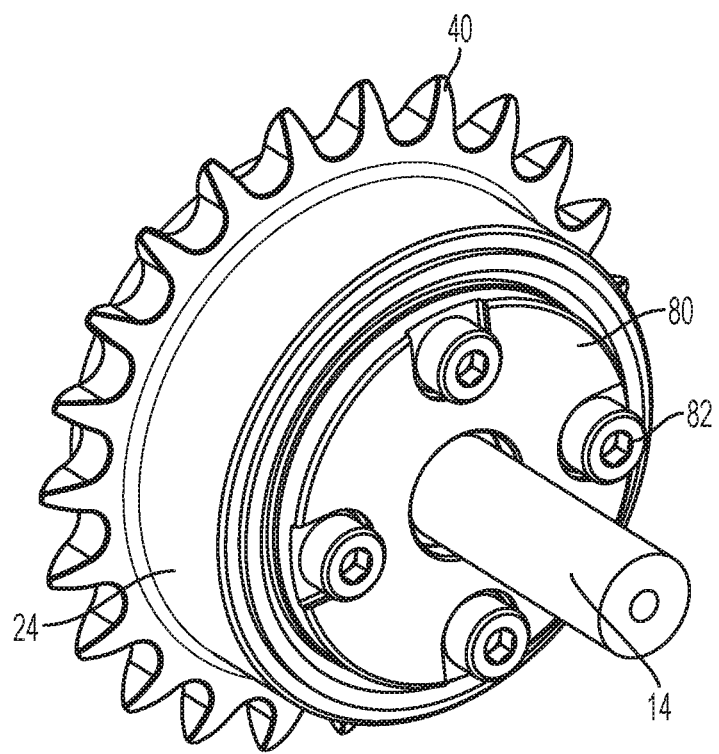
FIG. 2 is an assembled perspective view of the switchable one-way clutch of FIG. 1, according to one embodiment.
Figure 3:
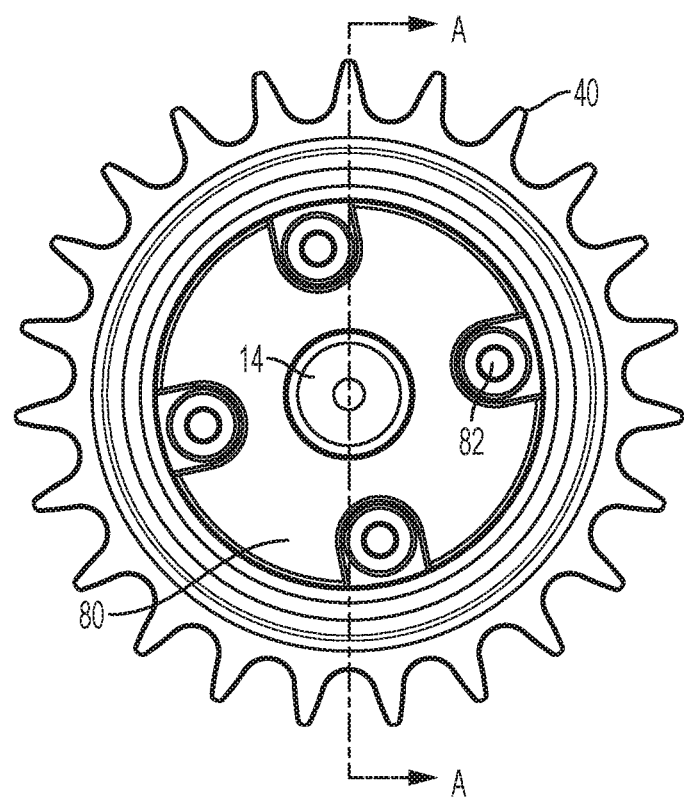
FIG. 3 is a front plan view of the assembled switchable one-way clutch of FIG. 2, according to one embodiment.
Figure 4:
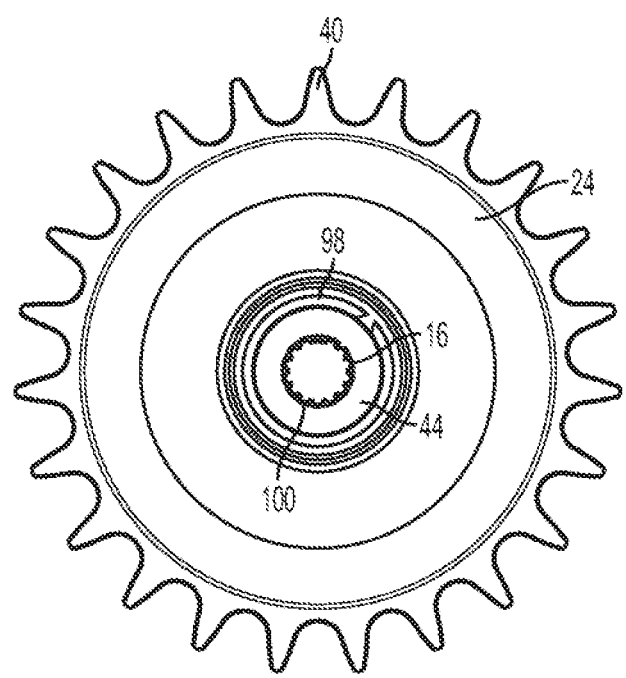
FIG. 4 is a rear plan view of the assembled switchable one-way clutch of FIG. 2, according to one embodiment.
Figure 5:
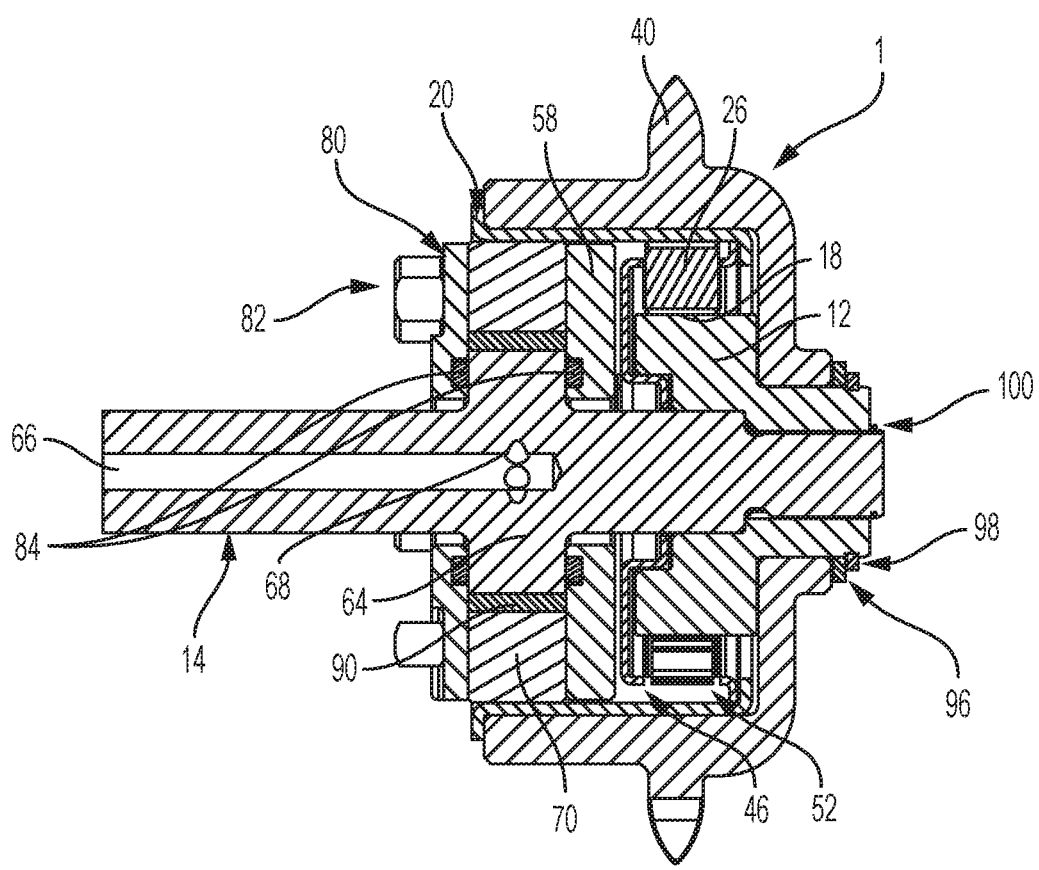
FIG. 5 is a cross-sectional view taken along line A-A of FIG. 3, according to one embodiment.

One embodiment of a SOWC 10 of the present disclosure is illustrated in FIGS. 1-5. FIG. 1 is an exploded perspective view of the various components of the SOWC 10, and FIG. 2 is an assembled view of the SOWC 10. FIG. 3 is a front view of the assembled SOWC 10, and FIG. 4 is a rear view of the assembled SOWC 10. FIG. 5 is a cross-sectional view taken along line A-A of FIG. 3.

Referring to the Figures generally, the SOWC 10 includes an inner race 12 that is fixed to a center shaft 14 (e.g., an oil pump drive shaft). The connection between the inner race 12 and the center shaft 14 may be made via a spline connection, for example, shown at 16. The inner race 12 has a plurality of cammed surfaces or cams 18 that enable the one-way clutch feature, as will be described below. The SOWC 10 also includes an outer race 20 with a smooth or cylindrical (i.e., no cams) outer surface 22 and inner surface (not numbered). A chain sprocket 24 is installed integrally with the outer surface 22 of the outer race 20 of the SOWC 10.

The SOWC 10 also has a plurality of rollers 26. The rollers 26 enable the one-way clutch functionality within the SOWC 10. In particular, when the outer race 20 is rotated in one direction (e.g., a "lockup" direction) relative to the inner race 12, the rollers 26 are forced into wedge-shaped gaps between the outer race 20 and the cams 18. Friction between those parts and the rollers causes the lockup to prevent relative rotation between the inner race and the outer race, and hence between the center shaft 14 and the outer race 20. Three or more rollers 26 may be provided in the SOWC 10, and the embodiment shown in FIG. 1 has five rollers 26 spaced evenly about the inner race 12. Since the cams 18 are located on the inner race 12, and the outer race 20 includes a smooth cylindrical inside surface, the rollers 26 are not able to "lift off" at a high freewheeling speed, thus enabling the SOWC 10 to transition from the freewheel mode to the lockup mode regardless of rotational speed.

Switching between the freewheel mode and the lockup mode is controlled via application of hydraulic fluid supplied by external means. The mechanism for performing the switching includes various components shown in the figures and described herein. Generally, the hydraulic switching mechanism contains a "fixed" portion that is integral to the shaft 14 (e.g., the lobes of the center shaft described below) onto which the inner race 12 is also fixed, and a "moveable" portion (e.g., the back cover or outer phaser described below) that has tabs or pegs that engage complementary holes or slots in the cage to facilitate the switch from the freewheel mode to the OWC mode. Additional detail of this will be described with reference to the individual components below.

Individual components of the SOWC 10 will now be described, along with their function and how the operation of the SOWC is performed utilizing these components.

Regarding the sprocket 24, the sprocket 24 may be connected to the outer race 20 via an interference fit. The sprocket 24 has a plurality of external teeth 40 which engage a drive chain (not shown) or toothed belt (not shown) from a parallel shaft elsewhere in the transmission. The sprocket 24 may be or include a profiled wheel with teeth, or cogs, that mesh with a chain, track or other perforated or indented material. As such, the sprocket 24 can be referred to as the input of the SOWC 10. The sprocket 24 also functions as a structural outer support ring for the outer race 20, which can be relatively thin. The sprocket 24 may also include a cylindrical bearing surface at one end that engages a journal that is integral to the inner race 12 to provide accurate centering and free rotation of sprocket and outer race assembly. The outer race 20 is deep-drawn and hardened to permit direct contact from the rollers 26. The outer race 20 also includes an inner diameter surface on its end toward the sprocket 24 that serves as a bearing surface that engages the outer cylindrical diameter of the housing 70 or outer phaser (described below).

Regarding the inner race 12, the inner race 12 may be made of hardened steel, and includes cams 18 on its exterior surface to enable the OWC functionality. The inner race 12 has a cylindrical inner diameter surface that is a close fit to the center shaft 14 for accurate centering with respect to the shaft 14. The inner race 12 also has a splined section 16 as described above, which engages corresponding external spline features of the center shaft 14 to lock rotation relative to the center shaft 14. The spline of the center shaft 14 may be missing one tooth (or have one extra-wide space between two adjacent teeth) in order to key angular position of the inner race 12 to that of the inner surface of the switching mechanism that is integral to the center shaft 14. The inner race 12 also has a surface 44 defining an external bearing journal adjacent to the cams 18 to provide a rotational bearing interface with the sprocket 24 as described above. The inner race 12 also has a counter-bore feature that engages an outer surface of a slightly smaller cylindrical snout 47 on the cage 46 (described below) to provide accurate centering of the cage 46 relative to the inner race 12. At the same end of the inner race 12 as the external bearing journal 44 is an external retaining groove to receive a retaining washer 96 and retaining ring 98 (described below) that provide axial retention of the sprocket 24 and outer race 20.

Regarding the cage 46, the cage 46 controls the functionality of the rollers 26. In the lockup or OWC mode, the cage allows the rollers 26 to be activated by springs 52 (described below). In the freewheel mode, a plurality of inwardly-extending tabs 56 arranged about an interior of the cage 46 push the rollers 26 against the force of the springs 52 and out of contact with the surfaces of the cams 18. This is accomplished through angular rotation of the back cover 58 (described below), whose integral tabs or pegs 60 engage complementary holes or slots in the axial face of the cage 46. In other words, the springs 52 bias the rollers to contact the sides of the cams 18 in the lockup or OWC mode; to convert the SOWC to the freewheel mode, the back cover 58 is forced to rotate, causing the cage 46 to rotate, which causes the cage's tabs 56 to press the rollers 26 into the grooves 30 and away from engagement with the cams 18. The snout 47 of the cage 46 engages the counter-bore feature of the inner race 12, as described above. The cage 46 also includes an outer cylindrical flange 62 at one axial end thereof which assists with both radial centering and axial positioning of the cage 46 relative to the outer race 20.

Regarding the springs 52, the springs 52 bias the rollers 26 into engagement with the cams 18 so that the SOWC 10 is biased in the locked or OWC mode. The springs 52 may be an accordion style of spring, each spring having one end anchored against the cage 46 and another end pressed against a respective one of the rollers 26.

Regarding the center shaft 14, this component is also known as the inner phaser. The center shaft extends along a central axis of the SOWC 10. One end of the center shaft 14 drives a separate transmission component (such as an oil pump) as an output of the SOWC 10. The center shaft 14 is shown as one embodiment, and may be designed in an application-specific manner, dependent upon the nature of the device whose rotation is being controlled by the SOWC 10. As such, the center shaft 14 may be referred to as an output shaft. The center shaft 14 should include the ability for supplying and exhausting pressurized hydraulic fluid into and out of the center shaft 14.

The center shaft 14 has a set of lobes 64 (also referred to as phaser lobes) formed integrally with the shaft. In another embodiment, the lobes 64 are separately connected to the center shaft. These lobes 64 can serve as an inner portion (i.e., "fixed" portion described above) of the hydraulic switching mechanism for the one-way clutch activation aspect of the SOWC 10. The center shaft 14 also has a blind axial passageway 66 to contain the flow of pressurized fluid, and also at least one radial passageway 68 extending radially out from the axial passageway 66, one radial passage per phaser lobe 64. And, as explained above, the center shaft 14 has external splines to engage with those of the inner race 12 at 16 to transfer torque from the inner race 12 to the center shaft 14 when the SOWC is operating in one of the modes that allows the torque to transfer.

The SOWC 10 may also include a housing 70, also referred to as an outer phaser. The housing 70 has a cylindrical outer surface 72 that acts as a bearing surface and engages the inner surface of the outer race 20, enabling free rotation of the sprocket 24 and the connected outer race 20 relative to the housing 70. The housing 70 also has an inner region 74 defining chambers 75 therebetween serving as outer portions (i.e., "moveable" portion described above) of the hydraulic switching mechanism for the one-way clutch activation aspect of the SOWC 10. The lobes 64 of the shaft 14 fit within the chambers 75 of the housing 70, with room to allow for slight rotation of the housing 70 relative to the shaft 14. In other words, the housing 70 can rotate relative to the shaft 14 until the walls of the chambers 75 contact the walls of the lobes 64. Springs 94, also referred to as phaser bias springs, are also in the chambers 75 and bias the housing 70 in one direction (e.g., to the position that allows freewheeling).

In use, hydraulic fluid is applied to change the SOWC 10 between operating in the freewheel mode and operating in the lockup mode. Hydraulic fluid is applied from an actuator (not shown). When the hydraulic fluid is applied, the fluid travels axially through the axial passageway 66 and then through the radial passageways 68. The fluid then exits the radial passageways 68 at openings 69 and fills the chamber 75 located circumferentially between the lobes 64 (e.g., inner phaser) and the housing 70 (e.g., outer phaser). This causes the housing 70 to press against the biasing force of the springs 94. Rotation of the housing 70 causes the back cover 58 to rotate therewith. The tabs 60 on the back cover force the cage 46 to also rotate. When the cage 46 is forced to rotate, the tabs 56 of the cage 46 disengage from the rollers 26, allowing the rollers to travel radially outward (via springs 52) and along the sloped side surfaces the cams 18. Thus, the application of hydraulic fluid causes the rollers 26 to move radially outwardly relative to the grooves 30, locking the inner race to the outer race and locking rotation of the SOWC in one direction (while still allowing freewheeling in the opposite direction). Removal of the hydraulic fluid allows the springs to return to their natural biasing state and the clutch to return to the freewheeling mode. In particular, the springs 94 force the housing 70 to rotate back to its original, biased position, causing the cage 46 to rotate back to its original position which forces the rollers 26 back down into the grooves 30 to prevent locking of the inner race 12 to the outer race 20. Of course, in another embodiment, the clutch can be reversed so that it is biased in the locked mode. In such an embodiment, the springs are biased such that application of hydraulic fluid forces the rollers down into the grooves 30, allowing freewheeling.

The SOWC 10 may also include the back cover 58 (also referred to as a back cover phaser) (described above) and a front cover 80 (also referred to as a front cover phaser). The back cover 58 and front cover 80 are axially spaced from one another and work in combination with each other to axially seal pressurized fluid into the hydraulic switching mechanism. The back cover 58 and the front cover 80 can be attached via cap screws 82 extending through apertures in both covers and apertures in the housing 70. Thus, the back cover 58, front cover 80, and housing 70 are all clamped or fastened tightly together.

Each cover 58, 80 has a groove on an axial side thereof facing the center shaft 14 to receive an O-ring 84. The O-ring 84 provides a dynamic seal at the rotationally-oscillating interface between the covers 58, 80 and the center shaft 14 on either axial side of the center shaft 14 In other words, the O-ring 84 can compress and deform to provide a deformable seal between the covers 58, 80 and the center shaft 14 as the center shaft 14 rotates relative to the covers 58, 80.

Various other components are also illustrated to complete the embodiment illustrated in the Figures. An inner phaser tip seal 90 and an outer phaser tip seal 92 provide dynamic pressure seals at the radial interfaces inside the hydraulic switching mechanism. At least one spring 94, also referred to as a phaser bias spring, biases the hydraulic switching mechanism toward the freewheel mode of operation. At the sprocket end of the SOWC, a washer 96 provides a thrust surface between the sprocket 24 and a retaining ring 98, which provides axial captivation of the sprocket 24 onto the journal 44 of the inner race 12. Another retaining ring 100 is located on the axial end of the inner race 12 to provide axial captivation of the inner race onto the center shaft 14.

Figure 6A:
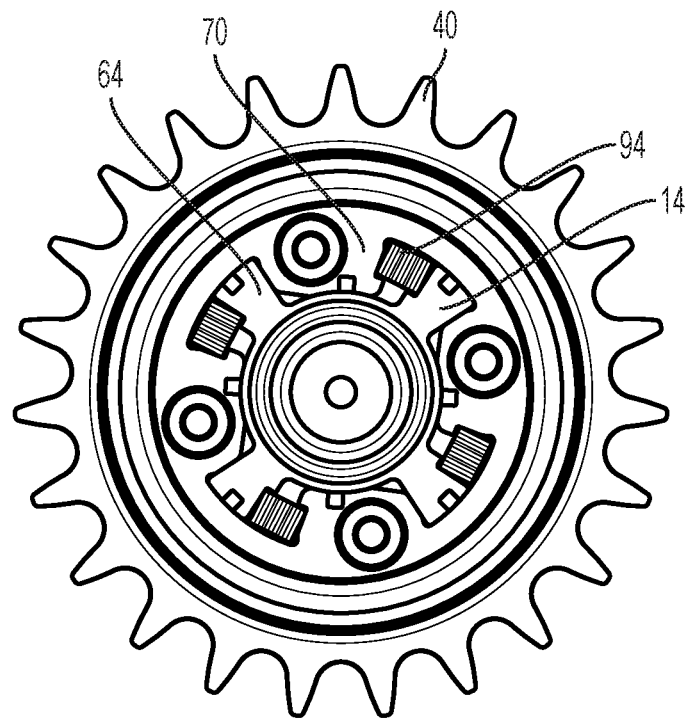
FIG. 6A is a front view of a switchable one-way clutch of FIG. 1 according to one embodiment with the front cover omitted for clarity. In this view, the switchable one-way clutch is in the freewheel mode.
Figure 6B:
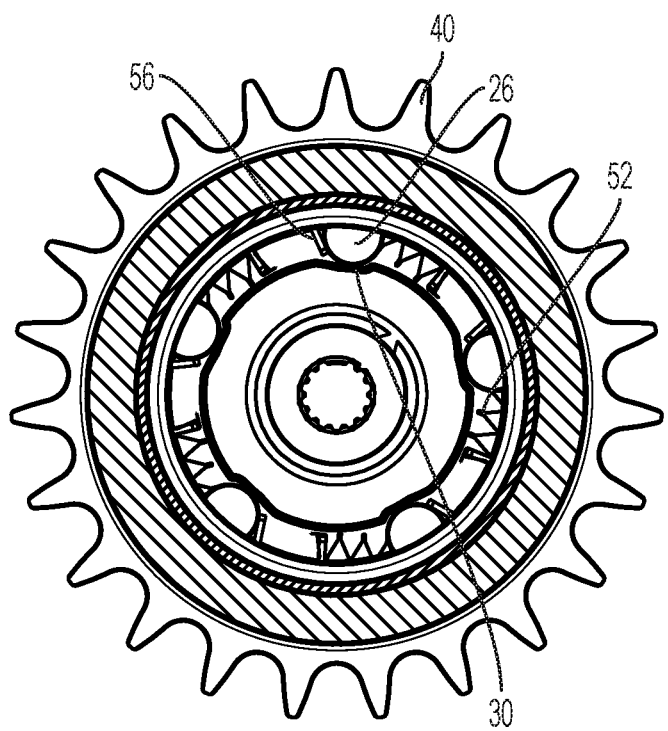
FIG. 6B is a rear view of the switchable one-way clutch of FIG. 6A.
Figure 7A:
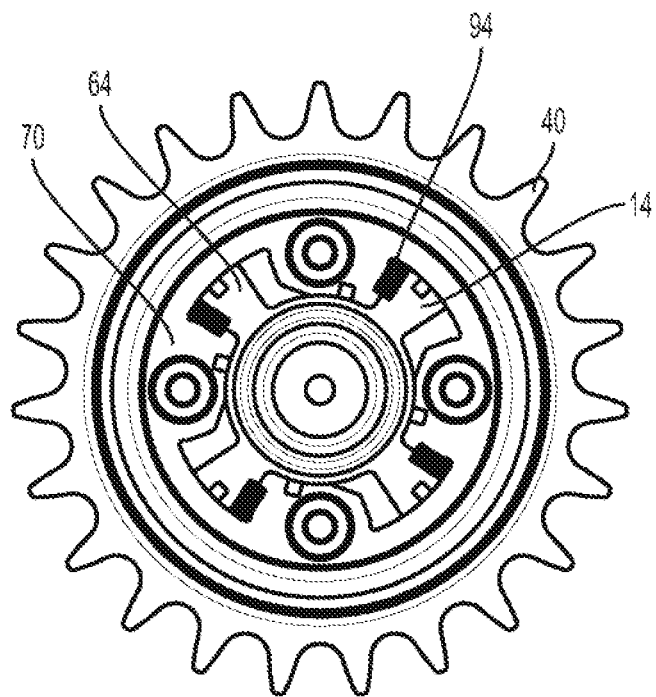
FIG. 7A is a front view of the switchable one-way clutch of FIG. 6A in the lockup or OWC mode.
Figure 7B:
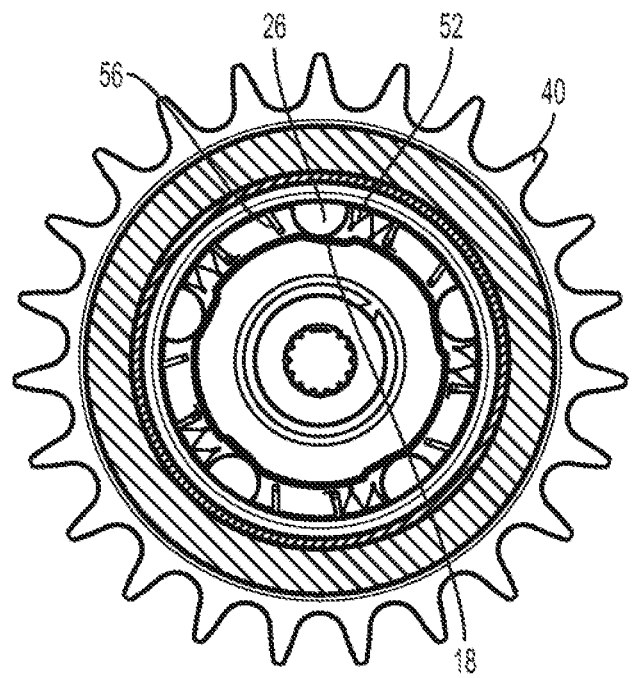
FIG. 7B is a rear view of the switchable one-way clutch of FIG. 7A.

FIGS. 6A-7B illustrate the two modes of operation of the SOWC, namely the freewheel mode and the lockup or OWC mode, according to one. FIGS. 6A-6B show the SOWC in the freewheel mode, and FIGS. 7A-7B show the SOWC in the lockup or OWC mode. In the freewheeling mode in FIGS. 6A-6B, the springs 94 biases the outer phaser 70 in one direction relative to the inner phaser 14. This causes the cage 46 to a position such that the tabs 56 press against the rollers 26 to force the rollers deeper (e.g., radially inward) into the grooves 30 to allow for relative movement between the inner and outer races in both directions. When hydraulic fluid is applied, the SOWC can transition into the locked or OWC mode shown in FIGS. 7A-7B. In this mode, the hydraulic pressure forces the outer phaser 70 to rotate relative to the inner phaser 14 (e.g., clockwise in the view shown). This compresses the springs 94. This also causes the cage 46 to rotate such that the tabs 56 release from the rollers 26, allowing the rollers to move radially outward along the inner race cams 18. This locks or prevents relative rotation between the inner and outer races in one direction, as described above, while still allowing freewheeling in the opposite direction.

The disclosure above describes one embodiment in which application of fluid causes the outer phaser to rotate such that the rollers move radially outwardly along the inner race cams and the SOWC can operate in the owc/locking mode. In other words, the SOWC normally operates and is biased such that it operates in the freewheeling mode, and only upon application of fluid is the SOWC able to operate in the owc/locking mode. The present disclosure is not limited to only that embodiment. In another embodiment, the outer phaser is biased in the other direction, such that the rollers are biased in a radially outward position to allow the SOWC to operate in the owc/locking mode. In that embodiment, application of hydraulic fluid causes the outer phaser to rotate relative to the inner phaser in such a manner that the rollers move radially inwardly into the grooves and the SOWC can operate in the freewheeling mode. Thus, application of hydraulic fluid in that embodiment changes the SOWC from the owc/locking mode to the freewheeling mode.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

PARTS LIST 10 switchable one-way clutch (SOWC)
12 inner race
14 shaft, inner phaser
16 spline connection
18 cams
20 outer race
22 outer surface
24 chain sprocket
26 rollers
30 grooves
40 teeth
44 extension portion
46 cage
47 snout
52 springs
56 tabs
58 back cover
60 tabs or pegs
62 cylindrical flange
64 lobes
66 axial passageway
68 radial passageway
69 opening
70 housing, outer phaser
72 outer surface of housing
74 inner region of housing
75 chamber
80 front cover
82 cap screws
84 O-ring
90 inner phaser tip seal
92 outer phaser tip seal
94 spring
96 retaining washer
98 retaining ring
100 retaining ring

The invention claimed is:

1. A switchable one-way clutch (SOWC) configured to operate in both a freewheeling mode and a one-way clutch mode, the SOWC comprising:
  an inner race having a plurality of cams;
  an outer race;
  a plurality of rollers disposed radially between the cams and the outer race;
  a cage having protrusions configured to selectively contact the rollers and force the rollers radially inward in the grooves;
  an inner phaser having a plurality of lobes extending radially outward; and
  an outer phaser having a plurality of inwardly-extending portions defining chambers therebetween, each chamber sized to receive a corresponding one of the lobes of the inner phaser, wherein the outer phaser is mechanically coupled to the cage;

wherein application of hydraulic fluid to the chambers between the inwardly-extending portions and the lobes causes the outer phaser to rotate relative to the inner phaser to rotate the protrusions away from the rollers, enabling the assembly to function as a one-way clutch.

2. The SOWC of claim 1, further comprising a plurality of springs in the chambers that bias the outer phaser in a first direction such that in the absence of hydraulic fluid the cage is biased to a position that forces the rollers radially inward into the grooves.

3. The SOWC of claim 2, wherein application of fluid forces the outer phaser to rotate against the biasing force of the plurality of springs and in a second direction to cause rotation of the cage in the second direction and allow the rollers to move radially outward along cams and lock the inner race to the outer race.

4. The SOWC of claim 1, further comprising a plurality of springs in the chambers that bias the outer phaser in a first direction such that in the absence of hydraulic fluid the cage is biased to a position that enables the rollers to move radially outward along the cams and lock the inner race to the outer race.

5. The SOWC of claim 4, wherein application of fluid forces the outer phaser to rotate against the biasing force of the plurality of springs and in a second direction to cause rotation of the cage in the second direction and force the rollers radially inward in the grooves to enable the inner race and outer race to freewheel.

6. The SOWC of claim 1, wherein the inner phaser and the lobes are a single integral component.

7. The SOWC of claim 1, further comprising a back cover mounted to the outer phaser and having a protrusion extending into the cage to mechanically couple the outer phaser to the cage.

8. The SOWC of claim 1, further comprising a sprocket coupled to the outer race, the sprocket having plurality of teeth configured to engage with a chain that drives the sprocket as an input to the SOWC.

9. The SOWC of claim 8, wherein the inner phaser is integral with an oil pump drive shaft extending through the sprocket, wherein operation of the SOWC selectively transfers torque from the sprocket to the oil pump drive shaft to drive an oil pump.

10. A switchable one-way clutch (SOWC), comprising:
an inner race having a plurality of cams;
an outer race configured to be selectively rotationally fixed to the inner race;
a plurality of rollers disposed radially between the cams and the outer race, wherein movement of the rollers radially outward along the cams engages the outer race with the inner race;
an inner phaser having a plurality of openings extending radially therethrough and a plurality of lobes extending radially outward; and
an outer phaser rotatable relative to the inner phaser and having a plurality of inwardly-extending portions, wherein the lobes and the inwardly-extending portions cooperate to define chambers, and wherein the outer phaser is biased to a first position relative to the inner phaser;

wherein application of hydraulic fluid through the openings and into the chambers causes the outer phaser to rotate relative to the inner phaser to a second position to force the rollers radially inward in the grooves to allow freewheeling between the inner race and the outer race.

11. The SOWC of claim 10, further comprising a cage coupled to the outer phaser and having a plurality of tabs, each tab configured to engage one of the rollers when the outer phaser rotates to the second position.

12. The SOWC of claim 11, further comprising a back cover mounted to the outer phaser, wherein the cage is assembled to the back cover.

13. The SOWC of claim 12, wherein the back cover includes a projection extending into the cage to directly couple the cage to the back cover.

14. The SOWC of claim 10, further comprising a sprocket coupled to the outer race, the sprocket having plurality of teeth configured to engage with a chain that drives the sprocket as an input to the SOWC.

15. A switchable one-way clutch (SOWC), comprising:
an inner race extending along an axis;
an outer race extending along the axis;
a plurality of rollers disposed about the axis and radially between the inner race and the outer race;
a first phaser having a plurality of openings extending radially therethrough and a plurality of lobes; and
a second phaser indirectly connected to the rollers, rotatable relative to the first phaser, and having a plurality of portions extending radially toward the first phaser, wherein the lobes of the first phaser extend radially toward the second phaser and cooperate with the portions of the second phaser to define chambers;
wherein application of hydraulic fluid into the chambers causes the second phaser to rotate relative to the first phaser to cause the rollers to move in a radial direction to alter the SOWC between a freewheeling mode and a locking mode.

16. The SOWC of claim 15, wherein the inner race has a plurality of grooves with ramped side surfaces, and the rotation of the second phaser relative to the first phaser forces the rollers to move along the ramped side surfaces.

17. The SOWC of claim 16, further comprising a cage disposed about the inner race and having a plurality of inwardly-extending tabs configured to force the rollers along the ramped side surfaces in response to the application of the hydraulic fluid.

18. The SOWC of claim 15, wherein in the freewheeling mode the inner race and outer race are free to rotate relative to one another in either rotational direction, and in the locking mode the inner race and outer race are locked in unison in one rotational direction but freewheel in the other rotational direction.

19. The SOWC of claim 15, wherein the first phaser and lobes are integral with a center shaft of the SOWC.

20. The SOWC of claim 15, further comprising a sprocket coupled to the outer race, the sprocket having plurality of teeth configured to engage with a chain that drives the sprocket as an input to the SOWC.

* * * * *